United States Patent [19]
Yang

[11] Patent Number: 5,906,413
[45] Date of Patent: May 25, 1999

[54] COVER CUSHION USED ON CAR SEAT COVERS

[75] Inventor: Ming-Shun Yang, Taipei, Taiwan

[73] Assignee: Formosa Saint Jose Corp., Taipei, Taiwan

[21] Appl. No.: 09/092,394

[22] Filed: Jun. 5, 1998

[51] Int. Cl.$^6$ .................................................. A47C 7/42
[52] U.S. Cl. .................. 297/284.5; 297/219.1; 297/284.11
[58] Field of Search .................. 297/219.1, 228.12, 297/284.5, 284.11, 397

[56] References Cited

U.S. PATENT DOCUMENTS

| | | | |
|---|---|---|---|
| 2,831,533 | 4/1958 | Pasquarelli | 297/284.5 |
| 2,867,266 | 1/1959 | Vogler | 297/397 X |
| 3,608,964 | 9/1971 | Earl | 297/397 |
| 4,206,945 | 6/1980 | Kifferstein | 297/397 X |
| 4,824,169 | 4/1989 | Jarrell | 297/284.5 X |
| 5,147,110 | 9/1992 | Syers | 297/397 |
| 5,297,304 | 3/1994 | O'Sullivan | 297/284.5 X |
| 5,735,283 | 4/1998 | Cassese et al. | 297/397 |

FOREIGN PATENT DOCUMENTS

| | | | |
|---|---|---|---|
| 1157490 | 5/1958 | France | 297/284.11 |

*Primary Examiner*—Peter R. Brown
*Attorney, Agent, or Firm*—Erik M. Arnhem

[57] ABSTRACT

A cushioned cover is used to put on the outside of the back or the seat of a car seat. This includes an upper longer mat, an lower shorter mat, and a soft resilient cylindrical pillow in between. All three parts are sewed up together in proper order to form a whole cushioned cover. There are four elastic anchorages sewed on the two ends of the top of the longer mat and on the two ends of the bottom of the shorter mat. The soft resilient cylindrical pillow is formed by by putting the foam rubber into the hollow bag. The cushioned cover is not only used to be the seat mats but also to support the thighs, or waist of the passengers by the soft resilient pillow, and to make the passengers feel comfortable.

1 Claim, 4 Drawing Sheets

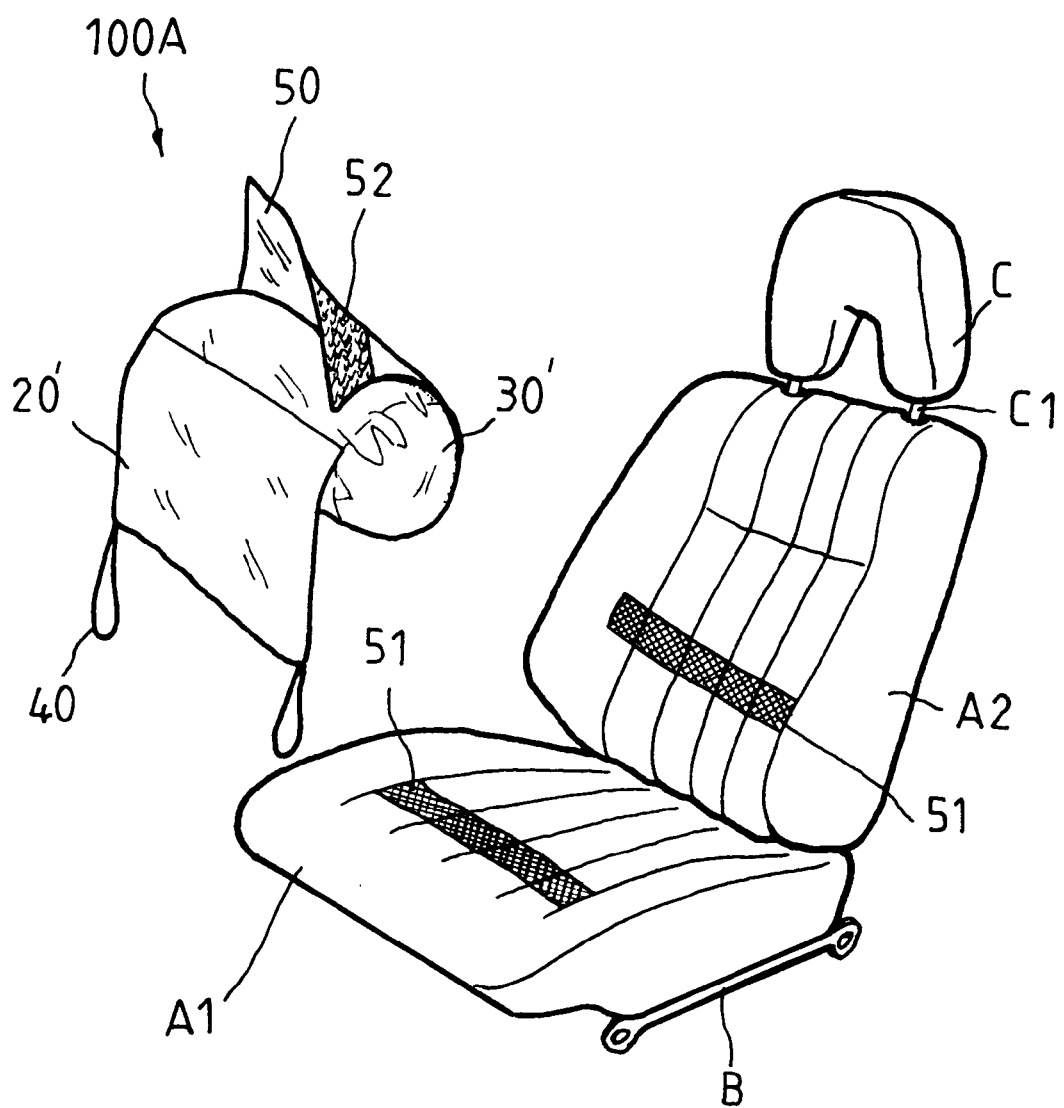
F I G . 6

COVER CUSHION USED ON CAR SEAT COVERS

BACKGROUND OF THE INVENTION

Car seats are used to support the back and the buttock of the passengers. Car owners like to cover their car seats with seat covers to embellish the car seat. However, passengers often feel uncomfortable while siting for prolonged periods in their car seats due to pains in the legs, loins and backs. This is why they have to change their postures frequently to reduce the pain. A principle reason for their discomfort is that they lean and sit their backs and buttocks on the hard and fixed seats for a long time.

Because the conventional car seats can not provide passengers with a comfortable seating, therefore the primary objective of the present invention is to provide a cushioned car seat covering that contributes to passenger comfort. The cushioned covering not only can be used to cover the car seat, but also to cushionably support the thigh and spine areas of the passengers.

SUMMARY OF THE INVENTION:

The present invention is used on the outside of the back cover or the seat cover of a car seat. This includes a relatively long upper panel, a relatively short lower panel, and a soft resilient cylindrical pillow in between. All three parts are sewed together in proper order to form a whole cover. There are four elastic anchorages on the ends of the upper and cover panels The soft resilient cylindrical pillow comprises a foam rubber cushion enclosed within a cylindrical fabric hollow bag. The cushion supports the thighs or waist of the passengers so as to make the passengers feel comfortable.

BRIEF DESCRIPTION OF THE DRAWINGS

FIG. 6 is an exploded perspective view of another embodiment of this invention.

DETAILED DESCRIPTION OF THE PREFERRED EMBODIMENTS

Figure 1:
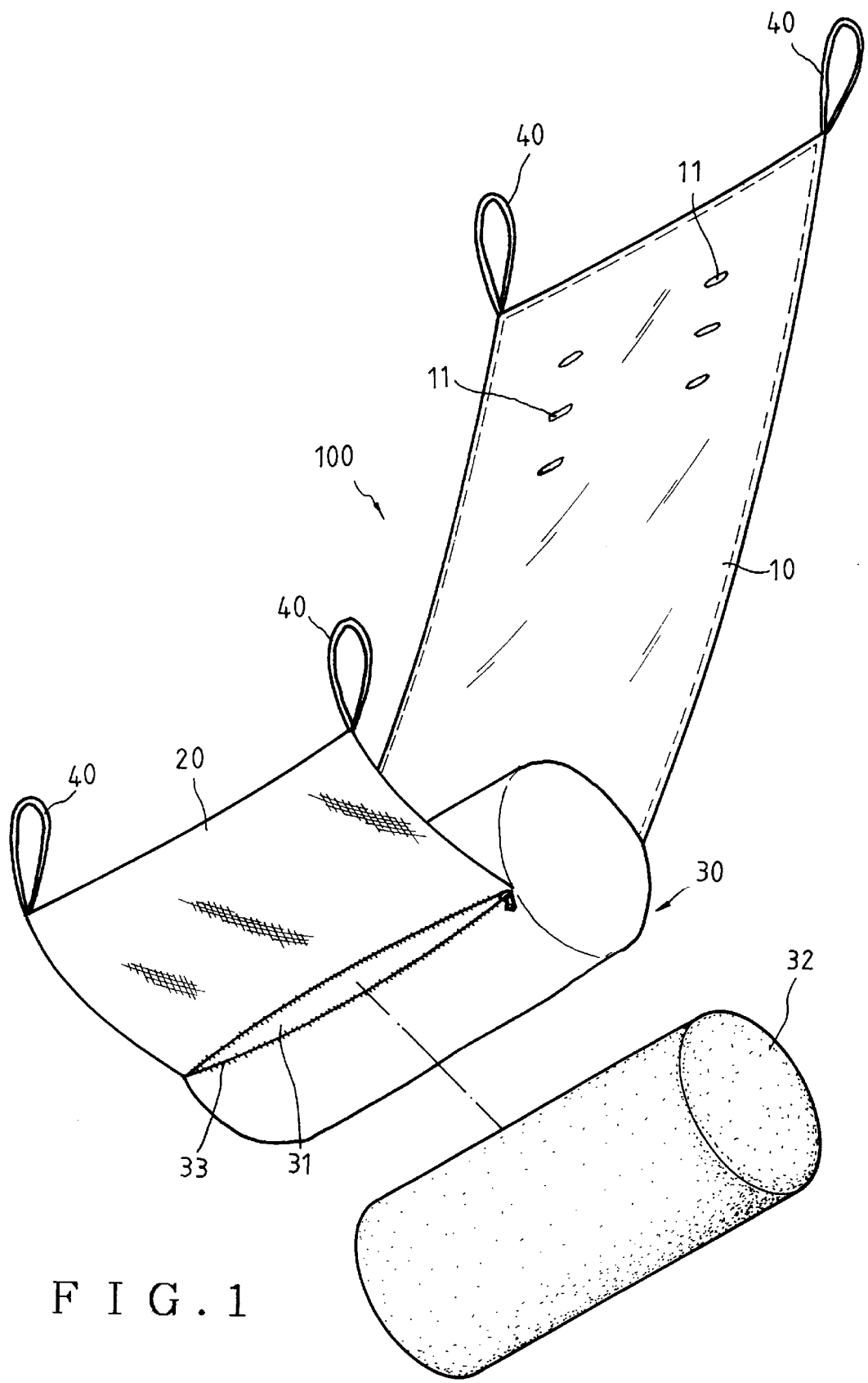
FIG. 1 is an exploded view of a car seat covering of this invention.
Figure 3:
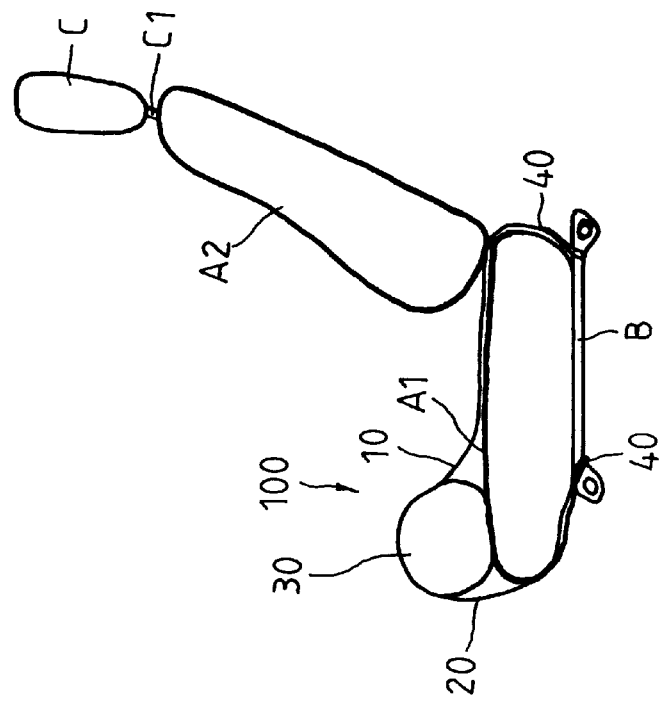
FIG. 3 is a side view of the FIG. 2 - installed car seat covering of this invention.
Figure 2:
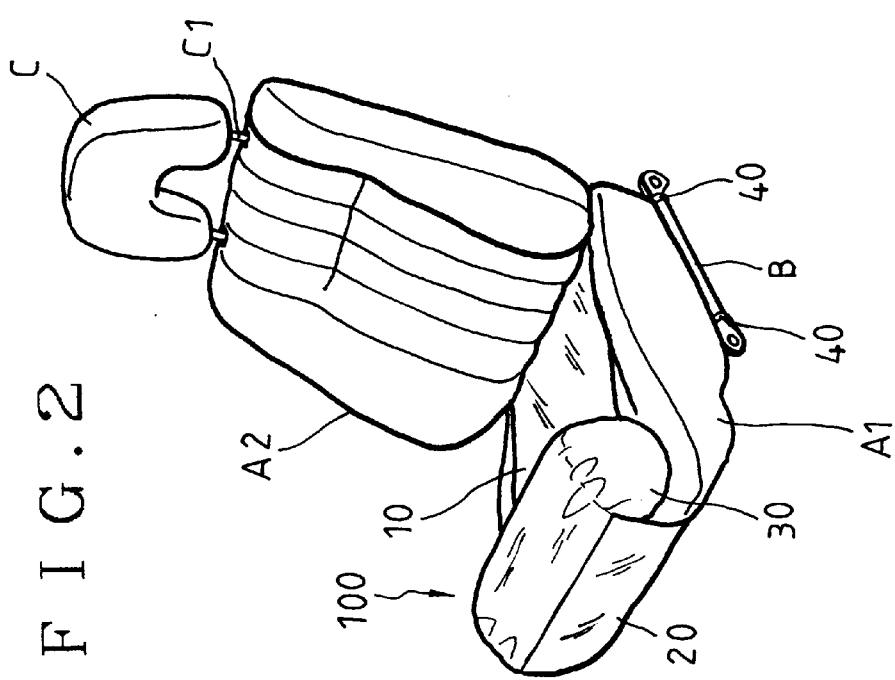
FIG. 2 is a perspective view of the FIG. 1 covering installed on the seat of a car seat.

Referring to FIGS. 1, 2, and 3, the cushioned covering (100) is used to cover the outside of a seat cover (A1) of a back cover (A2) of a car seat. The cushioned covering includes an upper mat or fabric panel (10), a lower mat or fabric panel (20), and a soft resilient cylindrical pillow (30) in between. Sequentially the upper panel (10), the soft resilient cylindrical pillow (30), and the lower panel (20) are sewed together to form cushioned covering.

There are two elastic anchorage loops (40) sewed on the free end of the upper mat (10), the elastics (40) can be hooked over a fixed frame (B) which is under the bottom of the seat to fix the mat or panel (10) with the seat. In the same way, there are two elastic anchorages (40) sewed on the free end of the smaller mat or panel (20) to be hooked over the fixed frame (B), to fix the mat (20) with the car seat.

A soft resilient cylindrical pillow (30) is located between the upper bigger mat (10) and the smaller mat (20). The soft resilient cylindrical pillow (30) comprises the foam rubber cushion (32) inserted into the hollow bag (31). A zipper (33) is sewed at the opening of the hollow cylindrical bag (31) to seal the foam rubber cushion (32) into tho hollow bag (31).

Referring to FIGS. 1, 2, and 3, the cushioned covering (100) is used to cover the outside of the seat cover (A1) of a car seat. The soft resilient cylindrical pillow (30) is used to support the thigh of the passenger by putting the soft resilient cylindrical pillow (30) at the front edge of the seat cover (A1). The longer upper mat (10) is then put on the outside of the seat cover (A1) and the smaller mat (20) is slid down in front of the seat. Folding the surplus of the longer mat (10) and the shorter mat (20) under the bottom of the car seat, and the elastic anchorage (40) are attached anywhere on the bottom fixed frame (B) to fix the covering (100) with the car seat. When passengers sit in the car seat, their thighs will rest comfortably on the soft resilient cylindrical pillow (30).

Figure 4:
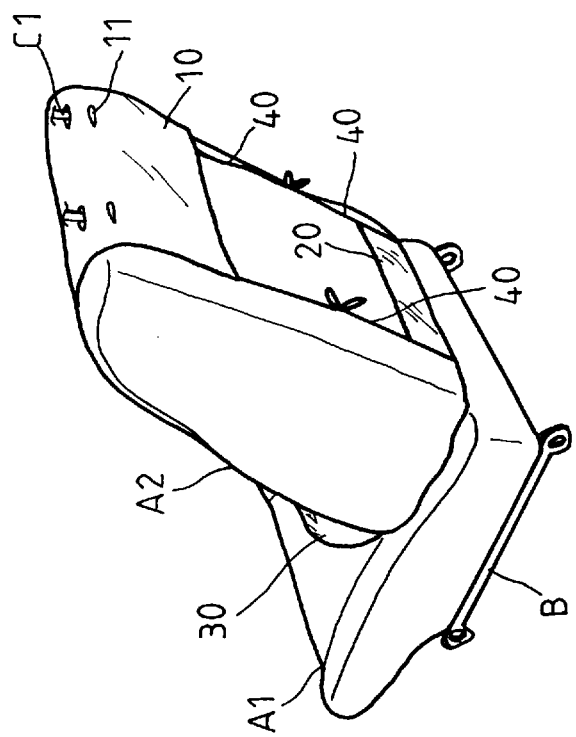
FIG. 4 is a perspective view of the FIG. 1 covering installed on the back of a car seat.
Figure 5:
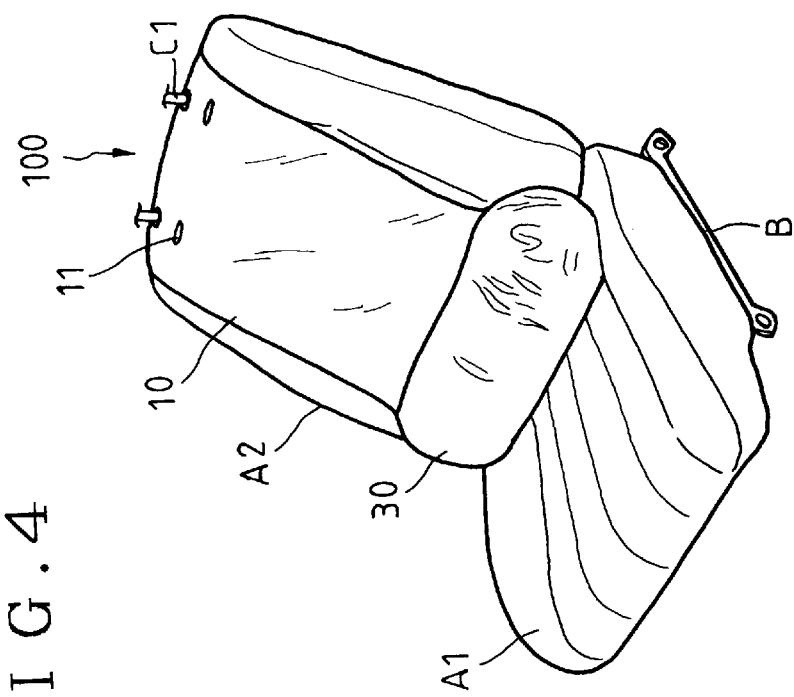
FIG. 5 is a side perspective view of the FIG. 4 - covered car seat of this invention.

Referring to FIGS. 1, 4, and 5, the cushioned covering (100) is used on the back cover (A2) of a car seat. The soft resilient cylindrical pillow (30) is used to support the waist or lower back of the passenger by putting the soft resilient cylindrical pillow (30) on the bottom edge of the back cover (A2). The longer mat (10) is then put on the outside of the back (A2). The surplus of the longer mat (10) and the shorter mat (20) are inserted into the back of the seat. The elastic anchorages (40) of the longer mat (10) and the shorter mat (20) are tied together to fix the cover cushion (100) with the car seat. When passenger.sit in the car seat, their waists will fit comfortably against the soft resilient cylindrical pillow (30).

Referring to FIGS. 1 and 5, the upper edge of the longer mat (10) of the cushioned cover (100) has multiple button holes (11) which are arranged symmetrically relative to the supporting bar (C1) of the headrest (C). The position of the soft resilient cylindrical pillow (30) allows free adjusting by a user through the button holes (11). When the user wants to raise the position of the soft resilient cylindrical pillow (30), he can put the supporting bar (C1) into the lower couple of the button holes (11). Alternatively the user can lower the position of the soft resilient cylindrical pillow (30).

Referring to FIG. 6, there is shown a perspective view of another embodiment of this invention. The illustrated cover cushion (100A) includes a upper connective cloth (50), a lower mat (20), and a soft resilient cylindrical pillow (30) that is put in between the connective cloth (50) and the mat (20). All three parts are sewed together in proper order. There is an adhesive hook-and-loop fastener (52) on one side of the connective cloth (50). As shown in FIG. 6 there is a hook-and-loop fastener (51) on the front edge surface of the seat cover (A1) and the front surface of the back cover (A2). The fasteners (52) and (51) are adhered to each other, to fix the cover cushion (100A) with the seat cover (A1) and the back cover (A2). When the connective cloth (50) is adhered to the front edge of a seat cover (A1), the soft resilient cylindrical pillow (30) is used as a thigh cushion. However, if the connective cloth (50) is adhered to the front surface of a back cover (A2), the soft resilient cylindrical pillow (30) is used as a waist cushion.

A cover cushion of the present invention is not only suitable for use on a car seat, but also can be used on a conventional chair or an office chair as a back cushion or a waist cushion From the above description, the cover cushion used on car seat covers according to the present invention is novel in design and practical for use, and is therefore an improvement on the conventional seat cover.

What is claimed is:

1. A cushioned car seat covering comprising:

a cylindrical bag that includes a cylindrical wall centered on an axis, and a zippered access opening extending along said cylindrical wall parallel to said axis;

a cylindrical resilient cushion insertable into said bag through said zippered access opening;

a first rectangular fabric panel (10) having first and second end edges; said first end edge being attached to the cylindrical wall of said bag, said second end edge having a first anchorage means (40) thereon;

a second rectangular fabric panel (20) having third and fourth end edges; said third end edge being attached to the cylindrical wall of said bag along a line diammetrically spaced from said first end edge; said fourth end edge having a second anchorage means (40) thereon;

each fabric panel having a length dimension measured between its end edges; the length of said first panel being substantially greater than the length of said second panel;

said cylindrical bag and contained cushion being adapted for selective positioning to a first position on the front edge of a car seat or a second position against the lower portion of a car seat back, whereby the seat user is selectively provided with a cushioning action on the rear surface of the user's lower thigh or on the lower surface area of the user's back;

said first and second anchorage means being connectable to front and rear areas of a car seat to retain said cushion in the first position; said first and second anchorage means being connectable to each other to retain said cushion in the second position.

* * * * *